(12) United States Patent
Tang

(10) Patent No.: US 11,696,316 B2
(45) Date of Patent: *Jul. 4, 2023

(54) DATA TRANSMISSION METHOD AND APPARATUS AND COMPUTER STORAGE MEDIUM

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,597

(22) Filed: Nov. 11, 2021

(65) Prior Publication Data
US 2022/0070873 A1    Mar. 3, 2022

Related U.S. Application Data

(63) Continuation of application No. 16/908,461, filed on Jun. 22, 2020, now Pat. No. 11,197,299, which is a
(Continued)

(51) Int. Cl.
*H04W 72/04* (2023.01)
*H04W 72/12* (2023.01)
(Continued)

(52) U.S. Cl.
CPC ....... *H04W 72/53* (2023.01); *H04W 72/0446* (2013.01); *H04W 72/1268* (2013.01);
(Continued)

(58) Field of Classification Search
CPC .. H04L 5/003–0098; H04W 8/18–245; H04W 48/02–20; H04W 72/005–14;
(Continued)

(56) References Cited

U.S. PATENT DOCUMENTS 11,197,299 B2 * 12/2021 Tang ................ H04W 72/0493
2010/0323610 A1    12/2010 Li et al.
(Continued)

FOREIGN PATENT DOCUMENTS

CN   1780457 A    5/2006
CN   102368759 A   3/2012
(Continued)

OTHER PUBLICATIONS

First Office Action issued in corresponding Korean Application No. 10-2020-7021748, dated May 18, 2022, 10 pages.
(Continued)

*Primary Examiner* — Timothy J Weidner
(74) *Attorney, Agent, or Firm* — Bayes PLLC

(57) ABSTRACT

Embodiments of the disclosure provide a method for transmitting data in a wireless communication network. A network device sends first configuration signaling to a terminal. The first configuration signaling is used to determine a first resource occupied by first data in a first slot. The network device also sends third configuration signaling to the terminal. The third configuration signaling is used to determine a second resource occupied by second data in the first slot and the third configuration signaling has a different type of configuration signaling from the first configuration signaling. When at least one time domain symbol in the second resource is located in the first resource in the first slot, the network device further determines, based on a preset policy, data transmitted in the first slot.

13 Claims, 5 Drawing Sheets

Related U.S. Application Data continuation of application No. PCT/CN2017/118491, filed on Dec. 26, 2017.

(51) Int. Cl.
*H04W 76/27* (2018.01)
*H04W 80/02* (2009.01)
*H04W 84/04* (2009.01)
*H04W 88/02* (2009.01)
*H04W 88/10* (2009.01)
*H04W 92/10* (2009.01)
*H04W 72/53* (2023.01)
*H04W 72/0446* (2023.01)
*H04W 72/1273* (2023.01)
*H04W 72/1268* (2023.01)
*H04W 72/23* (2023.01)
*H04W 72/50* (2023.01)
*H04W 72/231* (2023.01)
*H04W 72/232* (2023.01)

(52) U.S. Cl.
CPC ....... *H04W 72/1273* (2013.01); *H04W 72/23* (2023.01); *H04W 72/231* (2023.01); *H04W 72/232* (2023.01); *H04W 72/535* (2023.01); *H04W 76/27* (2018.02); *H04W 80/02* (2013.01); *H04W 84/042* (2013.01); *H04W 88/02* (2013.01); *H04W 88/10* (2013.01); *H04W 92/10* (2013.01)

(58) Field of Classification Search
CPC . H04W 74/002–008; H04W 76/10–38; H04W 80/02; H04W 84/02; H04W 84/04–045; H04W 88/02; H04W 88/04–10; H04W 92/04; H04W 92/10
See application file for complete search history.

(56) References Cited

U.S. PATENT DOCUMENTS

| | | | |
|---|---|---|---|
| 2014/0293843 | A1 | 10/2014 | Papasakellariou et al. |
| 2015/0092637 | A1 | 4/2015 | Yang et al. |
| 2016/0029231 | A1 | 1/2016 | Kazmi et al. |
| 2016/0100391 | A1 | 4/2016 | Park |
| 2016/0366672 | A1 | 12/2016 | Papasakellariou et al. |
| 2017/0135127 | A1 | 5/2017 | Nogami et al. |
| 2017/0265169 | A1 | 9/2017 | Chen et al. |
| 2017/0332386 | A1 | 11/2017 | Li et al. |
| 2018/0035332 | A1 | 2/2018 | Agiwal et al. |
| 2018/0167959 | A1 | 6/2018 | Liao et al. |
| 2018/0279304 | A1 | 9/2018 | Lee et al. |
| 2019/0059084 | A1 | 2/2019 | Lee et al. |
| 2020/0275418 | A1 | 8/2020 | Wong et al. |

FOREIGN PATENT DOCUMENTS

| | | | | |
|---|---|---|---|---|
| CN | 102523627 | A | 6/2012 | |
| CN | 106452704 | A | 2/2017 | |
| CN | 107371184 | A | 11/2017 | |
| CN | 107396394 | A | 11/2017 | |
| EP | 2323435 | A1 | 5/2011 | |
| EP | 2 790 453 | A1 | 10/2014 | |
| WO | 2015062063 | A1 | 5/2015 | |
| WO | 2015/134907 | A1 | 9/2015 | |
| WO | 2017079560 | A1 | 5/2017 | |
| WO | 2017161502 | A1 | 9/2017 | |
| WO | WO-2018093162 | A1 * | 5/2018 | .......... H04W 72/042 |

OTHER PUBLICATIONS

Extended European Search Report issued in corresponding European Application No. 22154480.2, dated Jun. 1, 2022, 12 pages.
First Office Action issued in corresponding Taiwanese Application No. 107147213, dated May 9, 2022, 14 pages.
First Office Action issued in corresponding Chinese Application No. 202010382646.6, dated Aug. 3, 2022, 23 pages.
"Discussion on Overlapping of Resource Pools", R1-144834, Source: ZTE, 3GPP TSG-RAN WG1 #79 San Francisco, USA, Nov. 17-21, 2014, 4 pages.
Supplemental European Search Report issued in corresponding European Patent Application No. EP 17 93 6531, dated Nov. 20, 2020, 9 pages.
First Office action issued in corresponding India Patent Application No. 202017031837, dated Aug. 27, 2021, 6 pages.
LG Electronics, "Discussion on group common PDCCH," 3GPP TSG RAN WGI #90bis, RI-1719919, Reno, US, Nov. 27-Dec. 1, 2017, 9 pgs.
NTT Docomo, Inc., "Remaining details on group-common PDCCH," 3GPP TSG RAN WGI Meeting 91, RI-1720813, Reno, USA, Nov. 27-Dec. 1, 2017, 7 pgs.
Qualcomm, "Remaining issues on slot format indication," 3GPP TSG RAN WGI #91, RI-1720677, Reno, USA, Nov. 27-Dec. 1, 2017, 11 pgs.
Samsung, "Remaining Issues on UE-Group Common PDCCH," 3GPP TSG RAN WGI #91, RI-1720321, Reno, USA, Nov. 9-13, 2017, 3 pgs.
Guangdong OPPO Mobile Telecommunications Corp. Ltd., International Search Report and Written Opinion, PCT/CN2017/118491, dated Sep. 5, 2018, 11 pgs.
MediaTek Inc., "UE behavior for GC PDCCH," RI-1713680, 3GPP TSG RAN WGI Meeting #90, Aug. 21-25, 2017, 2 pgs.
Notice of Reasons for Refusal issued in corresponding Japanese Patent Application No. 2020-535190, dated Jan. 4, 2022, 6 pages.
"Offline discussion on GC PDCCH carrying SFI", Agenda item: 7.3.1.3, Source: Qualcomm Incorporated, 3GPP TSG RAN WG1 #91 R1-1721674, Nov. 27-Dec. 1, 2017, Reno, USA, 19 pages.
Decision of Rejection issued in corresponding Korean application No. 10-2020-7021748, dated Nov. 17, 2022.

* cited by examiner

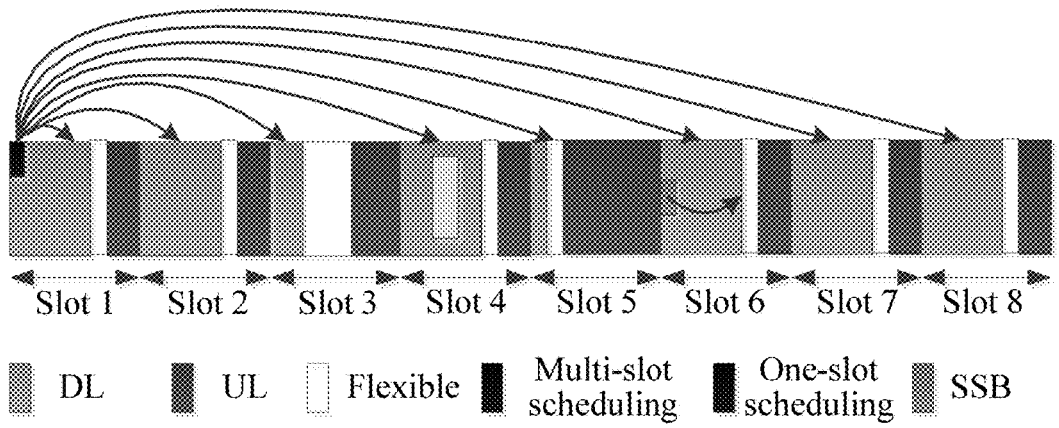

FIG. 1

```
┌─────────────────────────────────────────────────────────────────┐
│ A terminal receives first configuration signaling, and determines, based on the │  201
│ first configuration signaling, a first resource occupied by first data in a first slot, │
│   where a UL/DL type of the first data may indicate a transmission direction    │
│  corresponding to the first resource, the first resource includes at least one time │
│     domain symbol, the first configuration signaling schedules data in N slots  │
│             including the first slot, and N is an integer greater than 1        │
└─────────────────────────────────────────────────────────────────┘
                                    │
                                    ▼
┌─────────────────────────────────────────────────────────────────┐
│ The terminal receives second configuration signaling, and determines, based on │  202
│   the second configuration signaling, a transmission direction corresponding to │
│                    each time domain symbol in the first slot                    │
└─────────────────────────────────────────────────────────────────┘
                                    │
                                    ▼
┌─────────────────────────────────────────────────────────────────┐
│   If in the first slot, the transmission direction in the first resource determined │  203
│   based on the first configuration signaling is different from the transmission │
│    direction in the first resource determined based on the second configuration │
│        signaling, the terminal skips transmitting the first data in the first slot │
└─────────────────────────────────────────────────────────────────┘
```

FIG. 2

DATA TRANSMISSION METHOD AND APPARATUS AND COMPUTER STORAGE MEDIUM

CROSS-REFERENCE TO RELATED APPLICATION

This application is a continuation of U.S. application Ser. No. 16/908,461, filed on Jun. 22, 2020, which is a continuation of International Application No. PCT/CN2017/118491, filed on Dec. 26, 2017, both of which are hereby incorporated by reference in their entireties.

BACKGROUND

The present disclosure relates to the field of wireless communications technologies, and in particular, to a data transmission method and apparatus and a computer storage medium.

In a New Radio (NR) system, a slot or a symbol is used as a scheduling unit, and each slot includes 14 Orthogonal Frequency Division Multiplexing (OFDM) symbols. The NR system has a flexible frame structure. There may be a downlink (DL) symbol, an uplink (DL) symbol, and a flexible symbol. The flexible symbol is also referred to as an unknown symbol. The flexible symbol may be rewritten by using signaling for DL transmission or UL transmission.

In the NR system, a base station may use various manners to explicitly or implicitly indicate a transmission direction in a symbol in a slot, and in addition, may use various manners to indicate resource occupation in the slot. For multi-slot dynamic scheduling signaling, one piece of downlink control signaling such as downlink control information (DCI) may schedule multi-slot data transmission. In multi-slot data transmission scheduled based on multi-slot dynamic scheduling signaling, how to transmit data when a data transmission direction in a slot is opposite a data transmission direction configured by other signaling or there is a resource overlap is a problem to be resolved.

SUMMARY

To resolve the foregoing technical problem, embodiments of the present disclosure provide a data transmission method and apparatus and a computer storage medium.

Embodiments of the present disclosure provide a data transmission method, including sending, by a network device, first configuration signaling to a terminal, wherein the first configuration signaling is used to determine a first resource occupied by first data in a first slot. The method also includes sending, by the network device, third configuration signaling to the terminal, wherein the third configuration signaling is used to determine a second resource occupied by second data in the first slot and the third configuration signaling has a different type of configuration signaling from the first configuration signaling. The method further includes when at least one time domain symbol in the second resource is located in the first resource in the first slot, determining, by the network device based on a preset policy, data transmitted in the first slot. The first configuration signaling is downlink control information (DCI) and is used for scheduling of data in N slots, wherein the N slots include the first slot, and N is an integer greater than 1. When the third configuration signaling is user equipment (UE)-specific Radio Resource Control (RRC) signaling, the network device performs transmission of the first data in the first slot as scheduled by the first configuration signaling. When the third configuration signaling is cell-specific Radio Resource Control (RRC) signaling, the network device performs transmissions of the second data in the first slot as scheduled by the third configuration signaling.

Embodiments of the present disclosure also provide a network device. The network device includes a processor, a transceiver, a memory and instructions stored in the memory that, when executed by the processor, cause the network device to perform a plurality of operations including sending first configuration signaling to a terminal, wherein the first configuration signaling is used to determine a first resource occupied by first data in a first slot; sending third configuration signaling to the terminal, wherein the third configuration signaling is used to determine a second resource occupied by second data in the first slot and the third configuration signaling has a different type of configuration signaling from the first configuration signaling; and when at least one time domain symbol in the second resource is located in the first resource in the first slot, determining, based on a preset policy, data transmitted in the first slot via the transceiver. The first configuration signaling is downlink control information (DCI) and is used for scheduling of data in N slots, wherein the N slots include the first slot, and N is an integer greater than 1. When the third configuration signaling is user equipment (UE)-specific Radio Resource Control (RRC) signaling, the network device performs transmission of the first data in the first slot as scheduled by the first configuration signaling. When the third configuration signaling is cell-specific Radio Resource Control (RRC) signaling, the network device performs transmission of the second data in the first slot as scheduled by the third configuration signaling.

Embodiments of the present disclosure further provide a non-transitory computer storage medium, storing computer-executable instructions thereon. The computer-executable instructions are executed by a processor of a network device having a transceiver to implement a plurality of operations including: sending first configuration signaling to a terminal, wherein the first configuration signaling is used to determine a first resource occupied by first data in a first slot; sending third configuration signaling to the terminal, wherein the third configuration signaling is used to determine a second resource occupied by second data in the first slot and the third configuration signaling has a different type of configuration signaling from the first configuration signaling; and when at least one time domain symbol in the second resource is located in the first resource in the first slot, determining, based on a preset policy, data transmitted in the first slot via the transceiver. The first configuration signaling is downlink control information (DCI) and is used for scheduling of data in N slots, wherein the N slots include the first slot, and N is an integer greater than 1. When the third configuration signaling is user equipment (UE)-specific Radio Resource Control (RRC) signaling, the network device performs transmission of the first data in the first slot as scheduled by the first configuration signaling. When the third configuration signaling is cell-specific Radio Resource Control (RRC) signaling, the network device performs transmission of the second data in the first slot as scheduled by the third configuration signaling.

BRIEF DESCRIPTION OF THE DRAWINGS

The accompanying drawings shown herein are provided for further understanding of the present disclosure, and constitute a part of the present disclosure, and the exemplary embodiments of the present disclosure and its description are used for explaining the present disclosure, but do not constitute improper limitations to the present disclosure. In the accompanying drawings:

FIG. 1 is a schematic diagram of multi-slot scheduling;

FIG. 2 is a schematic flowchart 1 of a data transmission method according to an embodiment of the present disclosure;

DETAILED DESCRIPTION

Figure 3:
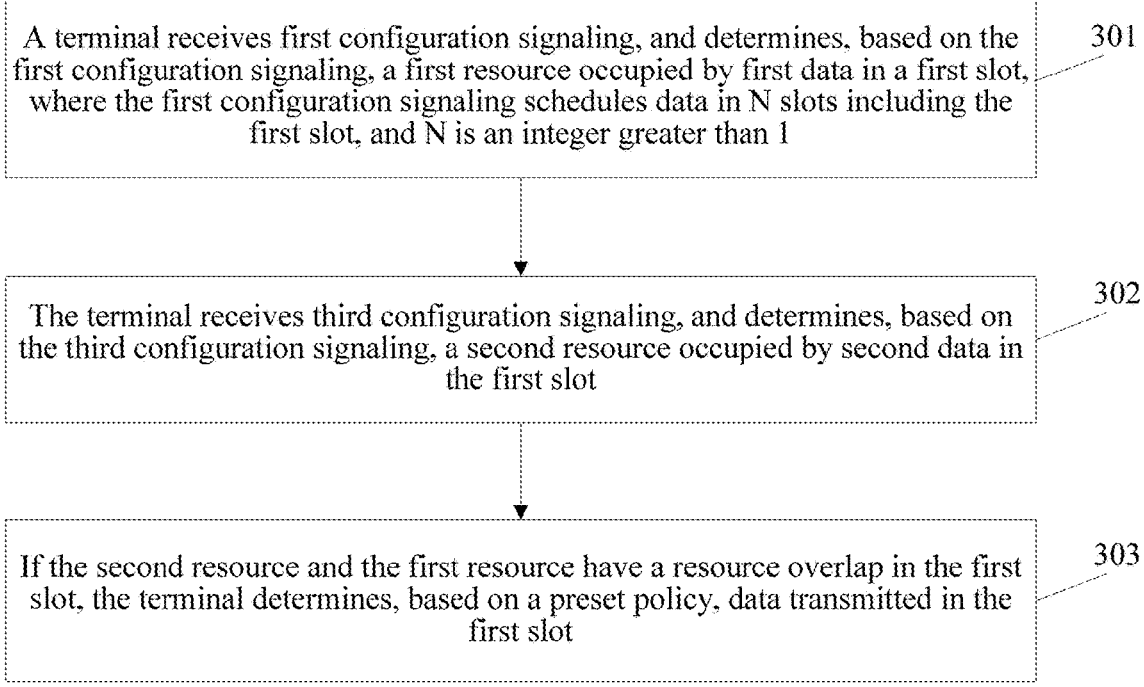
FIG. 3 is a schematic flowchart 2 of a data transmission method according to an embodiment of the present disclosure.

For ease of understanding of the technical solutions in the embodiments of the present disclosure, related configuration signaling in the embodiments of the present disclosure are described below.

1) Semi-static UL/DL configuration signaling is used to implement semi-static UL/DL configuration. Specifically, a slot format within one configuration period (for example, 5 ms or 10 ms) is configured by using semi-static RRC signaling. The slot format may indicate quantities and positions of UL symbols, DL symbols, and flexible symbols in each slot within one configuration period.

Further, the semi-static UL/DL configuration signaling includes the following two cases:

1.1) Common semi-static UL/DL configuration signaling is used to implement semi-static UL/DL common configuration, which is also referred to as cell-specific semi-static UL/DL configuration.

1.2) Dedicated semi-static UL/DL configuration signaling is used to implement semi-static UL/DL dedicated configuration, which is also referred to as user-specific semi-static UL/DL configuration.

2) Dynamic slot format indication signaling is used to implement a dynamic slot format indication. Specifically, the dynamic slot format indication signaling is carried in a group common PDCCH to be sent, and is used to dynamically indicate a slot format of each slot.

Further, the dynamic slot format indication signaling has the following two indication manners:

2.1) The dynamic slot format indication signaling indicates a direction in each symbol in each slot.

2.2) In combination with semi-static UL/DL configuration, the dynamic slot format indication signaling can only change a direction in a flexible symbol in the semi-static UL/DL configuration but cannot change a direction in a UL symbol and a direction in a DL symbol in the semi-static UL/DL configuration.

3) Dynamic scheduling signaling is used to implement dynamically scheduled data transmission. For example, data transmission scheduled by DCI is physical downlink shared channel (PDSCH)/physical uplink shared channel (PUSCH) transmission or physical uplink control channel (PUCCH) transmission that carries an acknowledgement (ACK)/negative-acknowledgement (NACK). For another example, measurement signal transmission scheduled by DCI is aperiodic channel state information (CSI)-reference signal (RS) transmission or aperiodic sounding reference signal (SRS) transmission. The data transmission or measurement signal transmission scheduled by the DCI implicitly indicates whether its corresponding symbol is a DL symbol or a UL symbol.

Further, the dynamic scheduling signaling includes the following two cases:

3.1) Multi-slot dynamic scheduling signaling: for example, one piece of DCI schedules data transmission in a plurality of consecutive slots, and the same time-frequency resource is used to transmit data in the plurality of slots.

3.2) One-slot dynamic scheduling signaling: one piece of DCI schedules data transmission in one slot.

4) UE-specific RRC signaling is used to implement UE-specific RRC signaling configured transmission, for example, periodic measurement signal transmission or physical random access channel (PRACH) transmission. UE-specific RRC signaling configured transmission also implicitly indicates whether its corresponding symbol is a DL symbol or a UL symbol. For example, a symbol corresponding to a periodic CSI-RS is a DL symbol, a symbol corresponding to a periodic SRS is a UL symbol, and a symbol corresponding to a PRACH is a UL symbol.

5) Cell-specific RRC signaling is used to implement cell-specific RRC signaling configured transmission, for example, transmission of SI such as remaining minimum SI (RMSI) or other SI (OSI). Cell-specific RRC signaling configured transmission similarly implicitly indicates whether its corresponding symbol is a DL symbol or a UL symbol.

Referring to FIG. 1, as a network schedules a terminal to perform multi-slot transmission, data transmission in a slot may encounter the following problems.

1) Transmission resources that can be used to transmit data in a slot are inadequate for scheduling.

For example, the network uses DCI to schedule eight slots to transmit DL data, and eight DL symbols are occupied in each slot to transmit the DL data. However, quantities of UL/DL symbols in different slots are flexibly configured. Therefore, the quantity of DL symbols in a slot may be less than the quantity of DL symbols required for scheduling.

In FIG. 1, DCI in a slot 1 schedules DL transmission in eight slots. Each slot occupies eight symbols. A quantity of usable DL symbols in a slot 3 is less than eight. In this case, how to transmit DL data in a slot is a problem to be resolved in the embodiments of the present disclosure.

2) A resource used to transmit data in a slot is already occupied by another resource.

For example, in a slot 4, some resources used to transmit data are used to transmit SI such as a synchronization signal block (SSB), RMSI or OSI. In this case, how to transmit DL data in a slot is a problem to be resolved in the embodiments of the present disclosure.

3) A resource used to transmit data in a slot is already occupied by dynamic one-slot scheduling.

For example, in a slot 6, there is dynamically scheduled one-slot transmission, and the one-slot transmission occupies some resources for multi-slot transmission. In this case, how to transmit data is a problem to be resolved in the embodiments of the present disclosure.

4) A transmission direction of a resource used to transmit data in a slot is opposite a transmission direction indicated by a slot format.

For example, in a slot 5, a slot format indicates that a slot includes two DL symbols, two flexible symbols, and 10 UL symbols. A symbol direction of some resources used to transmit data is opposite a symbol direction indicated by the slot format. In this case, how to transmit data is a problem to be resolved in the embodiments of the present disclosure.

FIG. 2 is a schematic flowchart 1 of a data transmission method according to an embodiment of the present disclosure. As shown in FIG. 2, the data transmission method includes the following steps.

Step 201: A terminal receives first configuration signaling, and determines, based on the first configuration signaling, a first resource occupied by first data in a first slot, where a UL/DL type of the first data may indicate a transmission direction corresponding to the first resource, the first resource includes at least one time domain symbol, the first configuration signaling schedules data in N slots including the first slot, and N is an integer greater than 1.

In this embodiment of the present disclosure, the first configuration signaling is multi-slot dynamic scheduling signaling, where the multi-slot dynamic scheduling signaling is DCI and/or a MAC CE. Multi-slot dynamic scheduling signaling may schedule a plurality of consecutive slots to transmit data.

In this embodiment of the present disclosure, the multi-slot dynamic scheduling signaling configures a transmission resource (referred to as the first resource) in a plurality of slots for a type of data (referred to as the first data). For example, the multi-slot dynamic scheduling signaling configures the following information: eight consecutive slots are configured, and the third to sixth symbols in each slot are used to transmit UL data. As can be learned, the third to sixth symbols are the first resource. It should be understood that the first resource may include one or more symbols. In addition, the symbols in this embodiment of the present disclosure are all time domain symbols such as OFDM symbols.

In this embodiment of the present disclosure, a UL/DL type of the first data implicitly indicates a transmission direction corresponding to the first resource. For example, the first data is UL data, and all the symbols in the first resource are UL symbols. For another example, the first data is DL data, and all the symbols in the first resource are DL symbols.

Step 202: The terminal receives second configuration signaling, and determines, based on the second configuration signaling, a transmission direction corresponding to each time domain symbol in the first slot.

In this embodiment of the present disclosure, the second configuration signaling is different from the first configuration signaling, and may be semi-static UL/DL configuration signaling and/or dynamic slot format indication signaling.

The semi-static UL/DL configuration signaling is used to configure a slot format, the slot format includes a transmission direction corresponding to each time domain symbol in a slot, and the transmission direction is UL transmission, DL transmission or flexible transmission.

The dynamic slot format indication signaling is used to indicate a slot format, the slot format includes a transmission direction corresponding to each time domain symbol in a slot, and the transmission direction is UL transmission, DL transmission or flexible transmission.

Herein, the semi-static UL/DL configuration signaling and the dynamic slot format indication signaling both may separately indicate a slot format. Alternatively, the semi-static UL/DL configuration signaling and the dynamic slot format indication signaling may be combined to indicate a slot format. When the two are combined to indicate a slot format, a dynamic slot format indication can only change a flexible symbol in a slot format indicated by the semi-static UL/DL configuration signaling.

In the foregoing solution, the semi-static UL/DL configuration signaling includes common semi-static UL/DL configuration signaling and dedicated semi-static UL/DL configuration signaling. Further, the semi-static UL/DL configuration signaling is RRC signaling or SI.

In the foregoing solution, the dynamic slot format indication signaling is a group common PDCCH.

Step 203: If in the first slot, the transmission direction in the first resource determined based on the first configuration signaling is different from the transmission direction in the first resource determined based on the second configuration signaling, the terminal skips transmitting the first data in the first slot.

In this embodiment of the present disclosure, that in the first slot, the transmission direction in the first resource determined based on the first configuration signaling is different from the transmission direction in the first resource determined based on the second configuration signaling includes: in the first slot, a transmission direction of at least one time domain symbol in the first resource determined based on the first configuration signaling is different from a transmission direction of the at least one time domain symbol determined based on the second configuration signaling.

Further, that a transmission direction of at least one time domain symbol in the first resource determined based on the first configuration signaling is different from a transmission direction of the at least one time domain symbol determined based on the second configuration signaling includes: the transmission direction of the at least one time domain symbol in the first resource determined based on the first configuration signaling is UL transmission, and the transmission direction of the at least one time domain symbol determined based on the second configuration signaling is DL transmission; or the transmission direction of the at least one time domain symbol in the first resource determined based on the first configuration signaling is DL transmission, and the transmission direction of the at least one time domain symbol determined based on the second configuration signaling is UL transmission; or in the foregoing solution, to ensure normal data transmission, the first configuration signaling configures that UL data can be transmitted in only a UL symbol or a flexible symbol configured by the second configuration signaling.

In this embodiment of the present disclosure, that the terminal skips transmitting the first data in the first slot includes a UL case and a DL case. Specifically:

1) If a type of the first data is UL data, the terminal skips sending the UL data in the first slot.

2) If a type of the first data is DL data, the terminal skips receiving the DL data in the first slot.

FIG. 3 is a schematic flowchart 2 of a data transmission method according to an embodiment of the present disclosure. As shown in FIG. 3, the data transmission method includes the following steps.

Step 301: A terminal receives first configuration signaling, and determines, based on the first configuration signaling, a first resource occupied by first data in a first slot, where the first configuration signaling schedules data in N slots including the first slot, and N is an integer greater than 1.

In this embodiment of the present disclosure, the first configuration signaling is multi-slot dynamic scheduling signaling. Further, the multi-slot dynamic scheduling signaling is DCI and/or a MAC CE.

Step 302: The terminal receives third configuration signaling, and determines, based on the third configuration signaling, a second resource occupied by second data in the first slot.

In this embodiment of the present disclosure, that the third configuration signaling is different from the first configuration signaling may include the following cases:

1) The third configuration signaling is one-slot dynamic scheduling signaling, and the one-slot dynamic scheduling signaling is used to indicate the second resource occupied by the second data in the first slot. Further, the one-slot dynamic scheduling signaling is DCI and/or a MAC CE.

2) The third configuration signaling is UE-specific RRC signaling.

3) The third configuration signaling is cell-specific RRC signaling.

Step 303: If the second resource and the first resource have a resource overlap in the first slot, the terminal determines, based on a preset policy, data transmitted in the first slot.

In this embodiment of the present disclosure, that the second resource and the first resource have a resource overlap in the first slot includes:

in the first slot, at least one time domain symbol in the second resource is located in the first resource.

If the second resource and the first resource have a resource overlap in the first slot, the terminal performs the following data transmission manners:

1) If the third configuration signaling is one-slot dynamic scheduling signaling, the terminal transmits the second data in the first slot.

2) If the third configuration signaling is UE-specific RRC signaling, the terminal transmits the first data in the first slot.

3) If the third configuration signaling is cell-specific RRC signaling, the terminal transmits the second data in the first slot.

In the foregoing solution, the transmitting, by the terminal, the second data in the first slot includes: if a type of the second data is UL data, sending, by the terminal, the second data in the first slot; or if a type of the second data is DL data, receiving, by the terminal, the second data in the first slot.

In the foregoing solution, the transmitting, by the terminal, the first data in the first slot includes: if a type of the first data is UL data, sending, by the terminal, the first data in the first slot; or if a type of the first data is DL data, receiving, by the terminal, the first data in the first slot.

Figure 4:
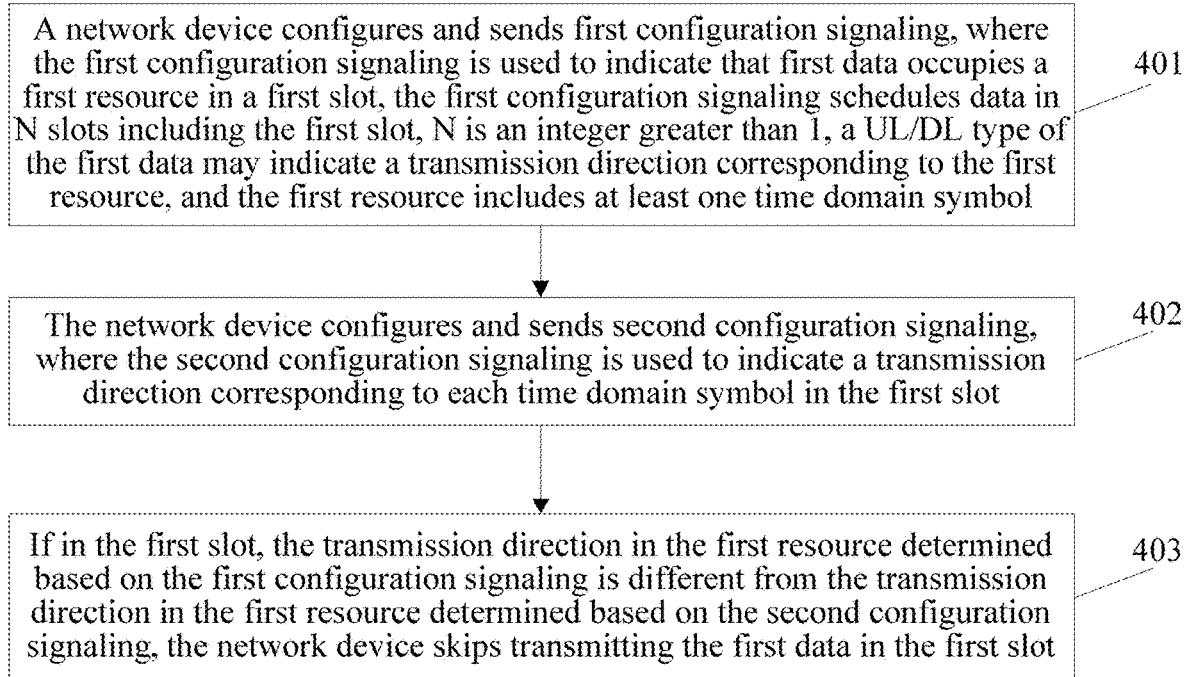
FIG. 4 is a schematic flowchart 3 of a data transmission method according to an embodiment of the present disclosure.

FIG. 4 is a schematic flowchart 3 of a data transmission method according to an embodiment of the present disclosure. As shown in FIG. 4, the data transmission method includes the following steps.

Step 401: A network device configures and sends first configuration signaling, where the first configuration signaling is used to indicate that first data occupies a first resource in a first slot, the first configuration signaling schedules data in N slots including the first slot, N is an integer greater than 1, a UL/DL type of the first data may indicate a transmission direction corresponding to the first resource, and the first resource includes at least one time domain symbol.

In this embodiment of the present disclosure, the first configuration signaling is multi-slot dynamic scheduling signaling, where the multi-slot dynamic scheduling signaling is DCI and/or a MAC CE.

Step 402: The network device configures and sends second configuration signaling, where the second configuration signaling is used to indicate a transmission direction corresponding to each time domain symbol in the first slot.

In this embodiment of the present disclosure, the second configuration signaling is semi-static UL/DL configuration signaling and/or dynamic slot format indication signaling.

The semi-static UL/DL configuration signaling is used to configure a slot format, the slot format includes a transmission direction corresponding to each time domain symbol in a slot, and the transmission direction is UL transmission, DL transmission or flexible transmission.

The dynamic slot format indication signaling is used to indicate a slot format, the slot format includes a transmission direction corresponding to each time domain symbol in a slot, and the transmission direction is UL transmission, DL transmission or flexible transmission.

Further, the semi-static UL/DL configuration signaling is RRC signaling or SI.

The dynamic slot format indication signaling is a group common PDCCH.

Step 403: If in the first slot, the transmission direction in the first resource determined based on the first configuration signaling is different from the transmission direction in the first resource determined based on the second configuration signaling, the network device skips transmitting the first data in the first slot.

In this embodiment of the present disclosure, that in the first slot, the transmission direction in the first resource determined based on the first configuration signaling is different from the transmission direction in the first resource determined based on the second configuration signaling includes: in the first slot, a transmission direction of at least one time domain symbol in the first resource determined based on the first configuration signaling is different from a transmission direction of the at least one time domain symbol determined based on the second configuration signaling.

Further, that a transmission direction of at least one time domain symbol in the first resource determined based on the first configuration signaling is different from a transmission direction of the at least one time domain symbol determined based on the second configuration signaling includes: the transmission direction of the at least one time domain symbol in the first resource determined based on the first configuration signaling is UL transmission, and the transmission direction of the at least one time domain symbol determined based on the second configuration signaling is DL transmission; or the transmission direction of the at least one time domain symbol in the first resource determined based on the first configuration signaling is DL transmission, and the transmission direction of the at least one time domain symbol determined based on the second configuration signaling is UL transmission; or in this embodiment of the present disclosure, the skipping, by the network device, transmitting the first data in the first slot includes: if a type of the first data is UL data, skipping, by the network device, receiving the UL data in the first slot; or if a type of the first data is DL data, skipping, by the network device, sending the DL data in the first slot.

Figure 5:
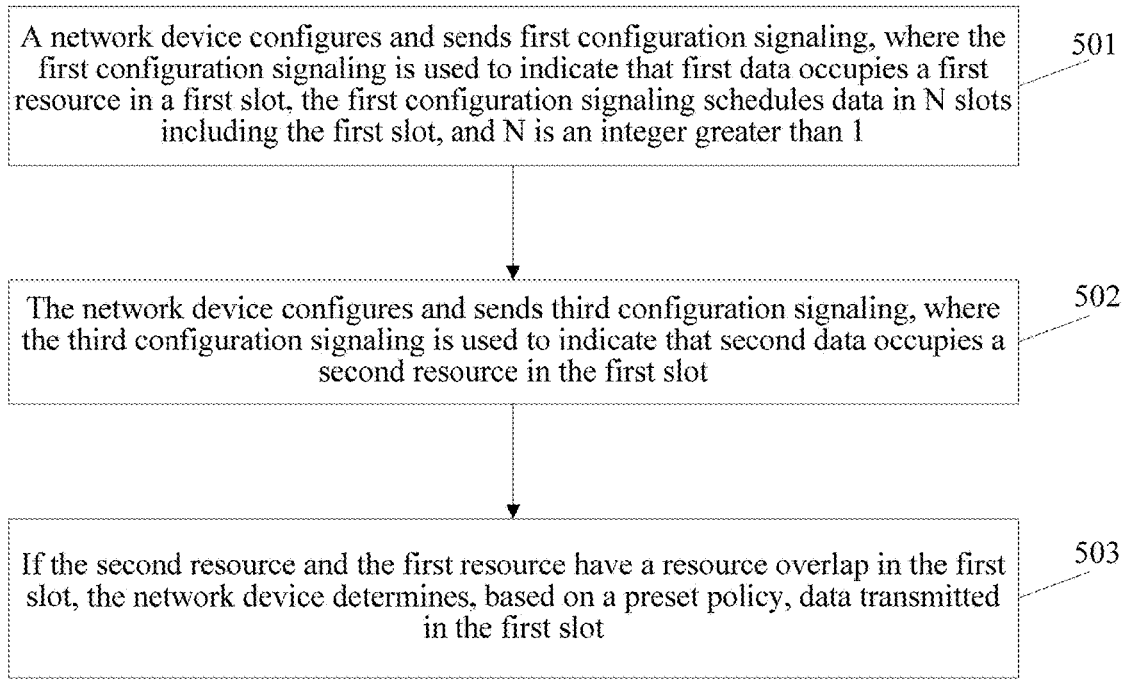
FIG. 5 is a schematic flowchart 4 of a data transmission method according to an embodiment of the present disclosure.

FIG. 5 is a schematic flowchart 4 of a data transmission method according to an embodiment of the present disclosure. As shown in FIG. 5, the data transmission method includes the following steps.

Step 501: A network device configures and sends first configuration signaling, where the first configuration signaling is used to indicate that first data occupies a first resource in a first slot, the first configuration signaling schedules data in N slots including the first slot, and N is an integer greater than 1.

In this embodiment of the present disclosure, the first configuration signaling is multi-slot dynamic scheduling signaling, where the multi-slot dynamic scheduling signaling is DCI and/or a MAC CE.

Step 502: The network device configures and sends third configuration signaling, where the third configuration signaling is used to indicate that second data occupies a second resource in the first slot.

In this embodiment of the present disclosure, the third configuration signaling has the following cases:

1) The third configuration signaling is one-slot dynamic scheduling signaling, and the one-slot dynamic scheduling signaling is used to indicate the second resource occupied by the second data in the first slot. The one-slot dynamic scheduling signaling is DCI and/or a MAC CE.

2) The third configuration signaling is UE-specific RRC signaling.

3) The third configuration signaling is cell-specific RRC signaling.

Step 503: If the second resource and the first resource have a resource overlap in the first slot, the network device determines, based on a preset policy, data transmitted in the first slot.

In this embodiment of the present disclosure, that the second resource and the first resource have a resource overlap in the first slot includes: in the first slot, at least one time domain symbol in the second resource is located in the first resource.

If the second resource and the first resource have a resource overlap in the first slot, the network device performs the following data transmission manners: 1) The third configuration signaling is one-slot dynamic scheduling signaling, the network device transmits the second data in the first slot.

2) If the third configuration signaling is UE-specific RRC signaling, the network device transmits the first data in the first slot.

3) If the third configuration signaling is cell-specific RRC signaling, the network device transmits the second data in the first slot.

In the foregoing solution, the transmitting, by the network device, the second data in the first slot includes: if a type of the second data is UL data, receiving, by the network device, the second data in the first slot; or if a type of the second data is DL data, sending, by the network device, the second data in the first slot.

In the foregoing solution, the transmitting, by the network device, the first data in the first slot includes: if a type of the first data is UL data, receiving, by the network device, the first data in the first slot; or if a type of the first data is DL data, sending, by the network device, the first data in the first slot.

The technical solutions in the embodiments of the present disclosure are further described below with reference to specific application examples.

Application example 1. Multi-slot dynamic scheduling signaling configured multi-slot transmission and a slot format configured by semi-static UL/DL configuration signaling. Specifically, a base station may configure a slot format by using the semi-static UL/DL configuration signaling. The slot format includes quantities and positions of UL symbols, DL symbols, and flexible symbols in each slot. The base station may schedule multi-slot data transmission by using multi-slot dynamic scheduling signaling (for example, DCI).

If multi-slot scheduled data transmission is DL transmission, DL data in a slot can be transmitted in only a DL symbol and a flexible symbol in a slot in semi-static UL/DL configuration.

If multi-slot scheduled data transmission is UL transmission, UL data in a slot can be transmitted in only a UL symbol and a flexible symbol in a slot in semi-static UL/DL configuration.

If a transmission direction of a symbol in which data transmission occurs in a slot in the multi-slot scheduled data transmission is opposite a transmission direction of a symbol of a slot in semi-static UL/DL configuration (transmission directions of one or more symbols of a plurality of symbols corresponding to data transmission are opposite transmission directions of corresponding symbols in semi-static UL/DL configuration, the network device skips sending DL data or receiving UL data in the slot, and a terminal skips receiving the DL data or sending the UL data in the slot.

Application example 2. Multi-slot dynamic scheduling signaling configured multi-slot transmission and a slot format indicated by a dynamic slot format. Specifically, the base station may configure a slot format by using semi-static UL/DL configuration signaling. The slot format includes quantities and positions of UL symbols, DL symbols, and flexible symbols in each slot. Based on this, the base station may use the dynamic slot format to indicate a further configured slot format. Herein, the dynamic slot format can only change a direction of a flexible symbol in semi-static UL/DL configuration. The base station may schedule multi-slot data transmission by using multi-slot dynamic scheduling signaling (for example, DCI).

If multi-slot scheduled data transmission is DL transmission, DL data in a slot can be transmitted in only a DL symbol and a flexible symbol in a slot indicated by the dynamic slot format.

If multi-slot scheduled data transmission is UL transmission, UL data in a slot can be transmitted in only a UL symbol and a flexible symbol in a slot indicated by the dynamic slot format.

If a transmission direction of a symbol in which data transmission occurs in a slot in the multi-slot scheduled data transmission is opposite a transmission direction of a symbol of a slot indicated by the dynamic slot format (transmission directions of one or more symbols of a plurality of symbols corresponding to data transmission are opposite transmission directions of corresponding symbols in semi-static UL/DL configuration, the network device skips sending DL data or receiving UL data in the slot, and a terminal skips receiving the DL data or sending the UL data in the slot.

Application example 3. Multi-slot dynamic scheduling signaling configured multi-slot transmission and one-slot dynamic scheduling signaling configured one-slot transmission. Specifically, the base station may schedule multi-slot data transmission by using multi-slot dynamic scheduling signaling (for example, DCI) or may schedule one-slot data transmission by using one-slot dynamic scheduling signaling (for example, DCI).

If the base station schedules multi-slot data transmission by using DCI, the base station also schedules one-slot data transmission by using DCI, and transmission resources used for one-slot transmission in the slot occupy some transmission resources used for multi-slot transmission, the base station performs the one-slot data transmission in the slot, and discards multi-slot data transmission.

Application example 4. Multi-slot dynamic scheduling signaling configured multi-slot transmission and UE-specific RRC signaling configured transmission. Specifically, the base station may schedule multi-slot data transmission by using multi-slot dynamic scheduling signaling (for example, DCI) or may schedule data transmission by using UE-specific RRC signaling. For example, a network uses UE-specific RRC signaling to configure periodically sent CSI-RSs or periodically sent SRSs.

If the base station schedules multi-slot data transmission by using DCI, the base station configures data transmission by using UE-specific RRC signaling, and transmission resources scheduled based on DCI in a slot and transmission resources of UE-specific RRC signaling configured transmission completely or partially overlap, the base station performs the multi-slot scheduled data transmission in the slot, and discards the UE-specific RRC signaling configured transmission.

Application example 5. Multi-slot dynamic scheduling signaling configured multi-slot transmission and cell-specific RRC signaling configured transmission. Specifically, the base station may schedule multi-slot data transmission by using multi-slot dynamic scheduling signaling (for example, DCI) or may configure data transmission by using cell-specific RRC signaling. For example, a network uses cell-specific RRC signaling to configure a transmission resource for transmitting an SSB or RMSI or OSI.

If the base station schedules multi-slot data transmission by using DCI, the base station configures data transmission by using cell-specific RRC signaling, and transmission resources for multi-slot transmission scheduled based on DCI in a slot and transmission resources of cell-specific RRC signaling configured transmission completely or partially overlap, the base station performs the cell-specific RRC signaling configured transmission in the slot, and discards the multi-slot data transmission scheduled based on DCI.

Figure 6:
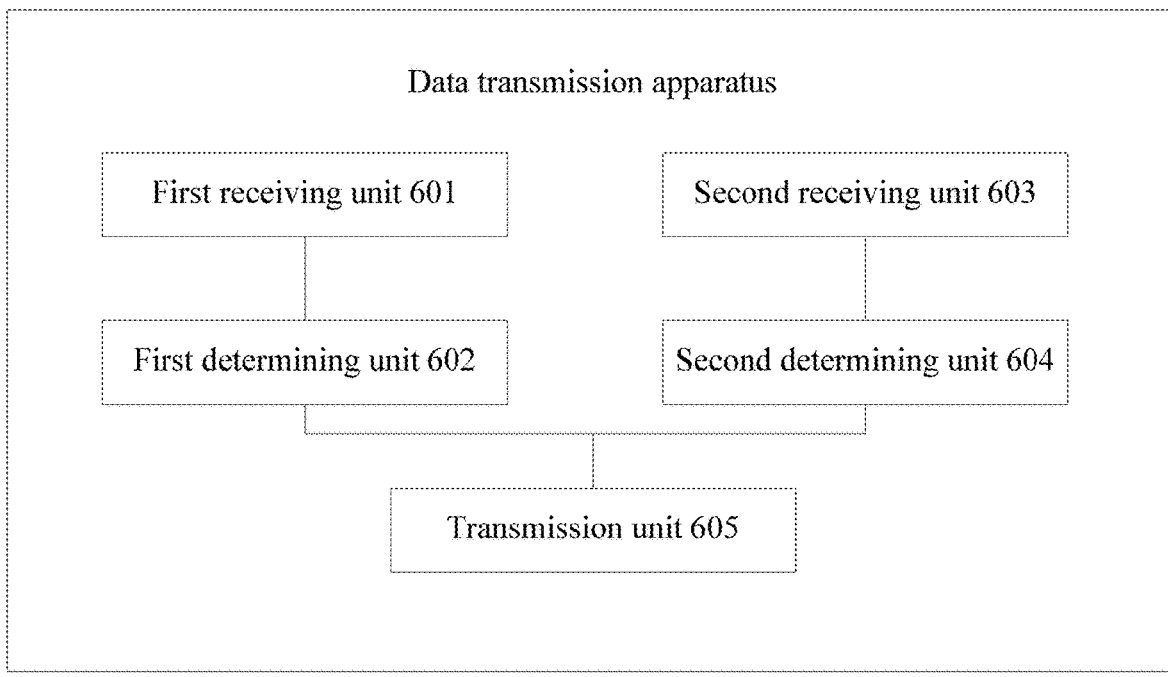
FIG. 6 is a schematic structural diagram 1 of a data transmission apparatus according to an embodiment of the present disclosure.

FIG. 6 is a schematic structural diagram 1 of a data transmission apparatus according to an embodiment of the present disclosure. As shown in FIG. 6, the apparatus includes: a first receiving unit 601, configured to receive first configuration signaling; a first determining unit 602, configured to determine, based on the first configuration signaling, a first resource occupied by first data in a first slot, where a UL/DL type of the first data may indicate a transmission direction corresponding to the first resource, the first resource includes at least one time domain symbol, the first configuration signaling schedules data in N slots including the first slot, and N is an integer greater than 1; a second receiving unit 603, configured to receive second configuration signaling; a second determining unit 604, configured to determine, based on the second configuration signaling, a transmission direction corresponding to each time domain symbol in the first slot; and a transmission unit 605, configured to: if in the first slot, the transmission direction in the first resource determined based on the first configuration signaling is different from the transmission direction in the first resource determined based on the second configuration signaling, skip transmitting the first data in the first slot.

In an implementation, that in the first slot, the transmission direction in the first resource determined based on the first configuration signaling is different from the transmission direction in the first resource determined based on the second configuration signaling includes:

in the first slot, a transmission direction of at least one time domain symbol in the first resource determined based on the first configuration signaling is different from a transmission direction of the at least one time domain symbol determined based on the second configuration signaling.

In an implementation, that a transmission direction of at least one time domain symbol in the first resource determined based on the first configuration signaling is different from a transmission direction of the at least one time domain symbol determined based on the second configuration signaling includes: the transmission direction of the at least one time domain symbol in the first resource determined based on the first configuration signaling is UL transmission, and the transmission direction of the at least one time domain symbol determined based on the second configuration signaling is DL transmission; or the transmission direction of the at least one time domain symbol in the first resource determined based on the first configuration signaling is DL transmission, and the transmission direction of the at least one time domain symbol determined based on the second configuration signaling is UL transmission; or in an implementation, the transmission unit 605 is configured to: if a type of the first data is UL data, skip, by the terminal, sending the UL data in the first slot; or if a type of the first data is DL data, skip, by the terminal, receiving the DL data in the first slot.

In an implementation, the second configuration signaling is semi-static UL/DL configuration signaling and/or dynamic slot format indication signaling.

The semi-static UL/DL configuration signaling is used to configure a slot format, the slot format includes a transmission direction corresponding to each time domain symbol in a slot, and the transmission direction is UL transmission, DL transmission or flexible transmission.

The dynamic slot format indication signaling is used to indicate a slot format, the slot format includes a transmission direction corresponding to each time domain symbol in a slot, and the transmission direction is UL transmission, DL transmission or flexible transmission.

In an implementation, the semi-static UL/DL configuration signaling is RRC signaling or SI; and the dynamic slot format indication signaling is a group common PDCCH.

In an implementation, the first configuration signaling is multi-slot dynamic scheduling signaling, where the multi-slot dynamic scheduling signaling is DCI and/or a MAC CE.

A person skilled in the art should understand that for the functions implemented by the units in the data transmission apparatus shown in FIG. 6, refer to the related descriptions of the foregoing data transmission methods for understanding. The functions of the units in the data transmission apparatus shown in FIG. 6 may be implemented by executing a program on a processor or may be implemented by a specific logic circuit.

Figure 7:
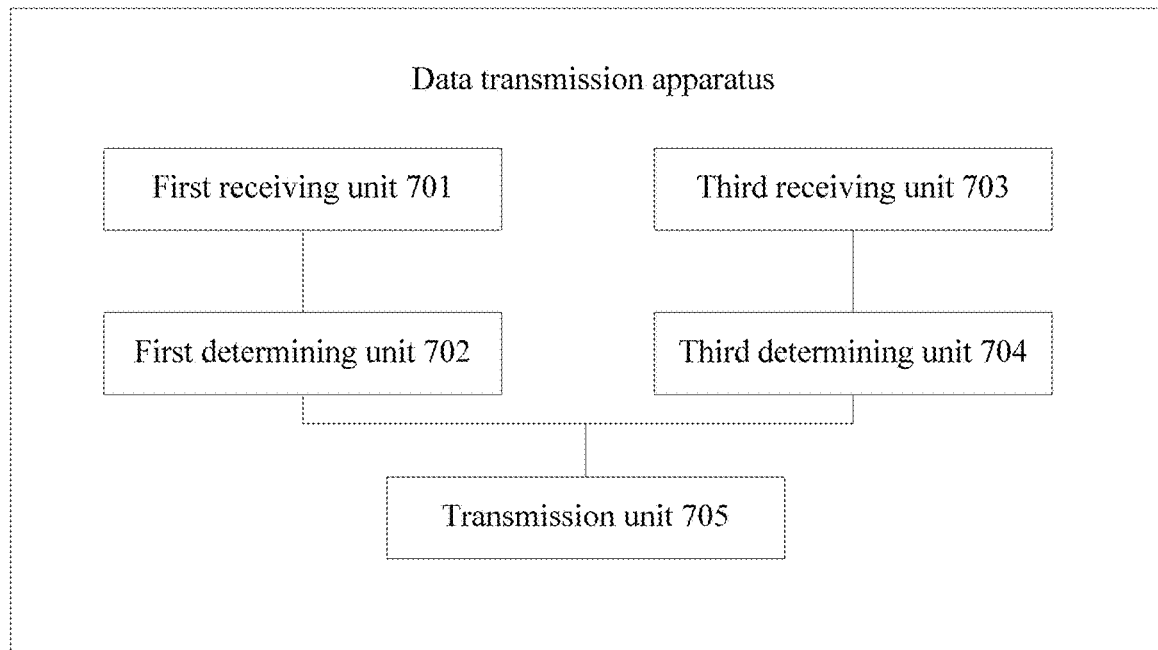
FIG. 7 is a schematic structural diagram 2 of a data transmission apparatus according to an embodiment of the present disclosure.

FIG. 7 is a schematic structural diagram 2 of a data transmission apparatus according to an embodiment of the present disclosure. As shown in FIG. 7, the apparatus includes: a first receiving unit 701, configured to receive first configuration signaling; a first determining unit 702, configured to determine, based on the first configuration signaling, a first resource occupied by first data in a first slot, where the first configuration signaling schedules data in N slots including the first slot, and N is an integer greater than 1; a third receiving unit 703, configured to receive third configuration signaling; a third determining unit 704, configured to determine, based on the third configuration signaling, a second resource occupied by second data in the first slot; and a transmission unit 705, configured to: if the second resource and the first resource have a resource overlap in the first slot, determine, based on a preset policy, data transmitted in the first slot.

In an implementation, that the second resource and the first resource have a resource overlap in the first slot includes: in the first slot, at least one time domain symbol in the second resource is located in the first resource.

In an implementation, the first configuration signaling is multi-slot dynamic scheduling signaling, where the multi-slot dynamic scheduling signaling is DCI and/or a MAC CE.

In an implementation, the third configuration signaling is one-slot dynamic scheduling signaling, and the one-slot dynamic scheduling signaling is used to indicate the second resource occupied by the second data in the first slot, where the one-slot dynamic scheduling signaling is DCI and/or a MAC CE.

In an implementation, the transmission unit 705 is configured to the second data in the first slot.

In an implementation, the third configuration signaling is UE-specific RRC signaling.

In an implementation, the transmission unit 705 is configured to the first data in the first slot.

In an implementation, the third configuration signaling is cell-specific RRC signaling.

In an implementation, the transmission unit 705 is configured to the second data in the first slot.

In an implementation, the transmission unit 705 is configured to: if a type of the second data is UL data, send the second data in the first slot; or if a type of the second data is DL data, receive the second data in the first slot.

In an implementation, the transmission unit 705 is configured to: if a type of the first data is UL data, send the first data in the first slot; or if a type of the first data is DL data, receive the first data in the first slot.

A person skilled in the art should understand that for the functions implemented by the units in the data transmission apparatus shown in FIG. 7, refer to the related descriptions of the foregoing data transmission methods for understanding. The functions of the units in the data transmission apparatus shown in FIG. 7 may be implemented by executing a program on a processor or may be implemented by a specific logic circuit.

Figure 8:
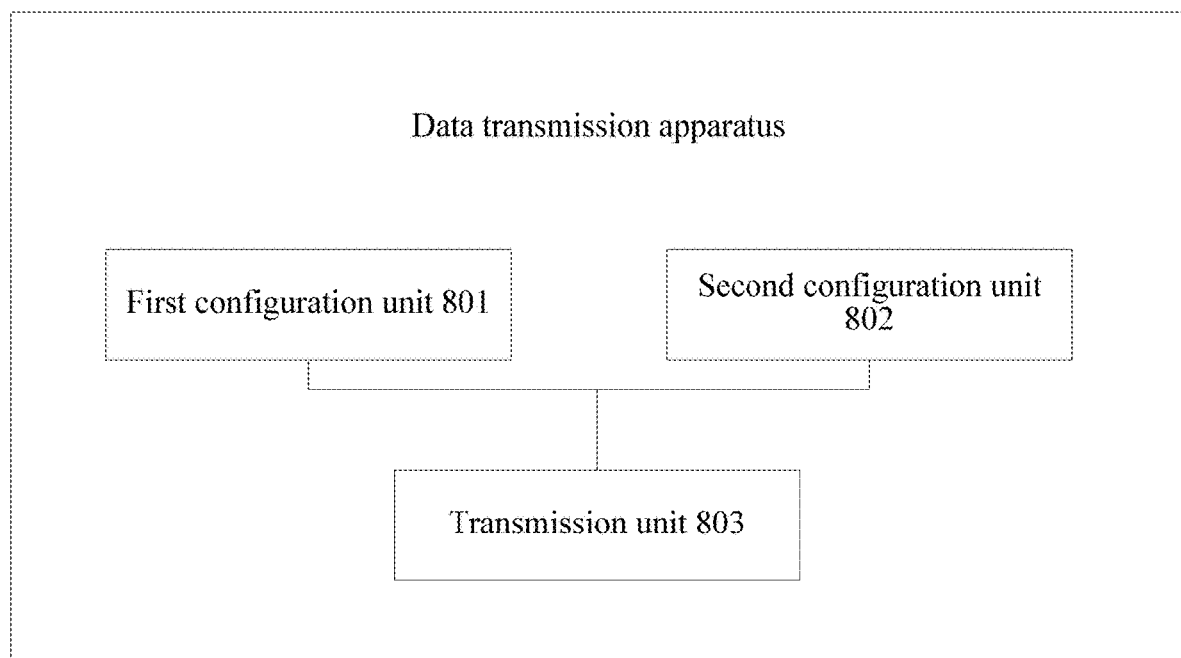
FIG. 8 is a schematic structural diagram 3 of a data transmission apparatus according to an embodiment of the present disclosure.

FIG. 8 is a schematic structural diagram 3 of a data transmission apparatus according to an embodiment of the present disclosure. As shown in FIG. 8, the apparatus includes: a first configuration unit 801, configured to configure and send first configuration signaling, where the first configuration signaling is used to indicate that first data occupies a first resource in a first slot, a UL/DL type of the first data may indicate a transmission direction corresponding to the first resource, the first resource includes at least one time domain symbol, the first configuration signaling schedules data in N slots including the first slot, and N is an integer greater than 1; a second configuration unit 802, configured to configure and send second configuration signaling, where the second configuration signaling is used to indicate a transmission direction corresponding to each time domain symbol in the first slot; and a transmission unit 803, configured to: if in the first slot, the transmission direction in the first resource determined based on the first configuration signaling is different from the transmission direction in the first resource determined based on the second configuration signaling, skip transmitting the first data in the first slot.

In an implementation, that in the first slot, the transmission direction in the first resource determined based on the first configuration signaling is different from the transmission direction in the first resource determined based on the second configuration signaling includes: in the first slot, a transmission direction of at least one time domain symbol in the first resource determined based on the first configuration signaling is different from a transmission direction of the at least one time domain symbol determined based on the second configuration signaling.

In an implementation, that a transmission direction of at least one time domain symbol in the first resource determined based on the first configuration signaling is different from a transmission direction of the at least one time domain symbol determined based on the second configuration signaling includes: the transmission direction of the at least one time domain symbol in the first resource determined based on the first configuration signaling is UL transmission, and the transmission direction of the at least one time domain symbol determined based on the second configuration signaling is DL transmission; or the transmission direction of the at least one time domain symbol in the first resource determined based on the first configuration signaling is DL transmission, and the transmission direction of the at least one time domain symbol determined based on the second configuration signaling is UL transmission; or in an implementation, the transmission unit 803 is configured to: if a type of the first data is UL data, skip receiving the UL data in the first slot; or if a type of the first data is DL data, skip sending the DL data in the first slot.

In an implementation, the second configuration signaling is semi-static UL/DL configuration signaling and/or dynamic slot format indication signaling.

The semi-static UL/DL configuration signaling is used to configure a slot format, the slot format includes a transmission direction corresponding to each time domain symbol in a slot, and the transmission direction is UL transmission, DL transmission or flexible transmission.

The dynamic slot format indication signaling is used to indicate a slot format, the slot format includes a transmission direction corresponding to each time domain symbol in a slot, and the transmission direction is UL transmission, DL transmission or flexible transmission.

In an implementation, the semi-static UL/DL configuration signaling is RRC signaling or SI; and the dynamic slot format indication signaling is a group common PDCCH.

In an implementation, the first configuration signaling is multi-slot dynamic scheduling signaling, where the multi-slot dynamic scheduling signaling is DCI and/or a MAC CE.

A person skilled in the art should understand that for the functions implemented by the units in the data transmission apparatus shown in FIG. 8, refer to the related descriptions of the foregoing data transmission methods for understanding. The functions of the units in the data transmission apparatus shown in FIG. 8 may be implemented by executing a program on a processor or may be implemented by a specific logic circuit.

Figure 9:
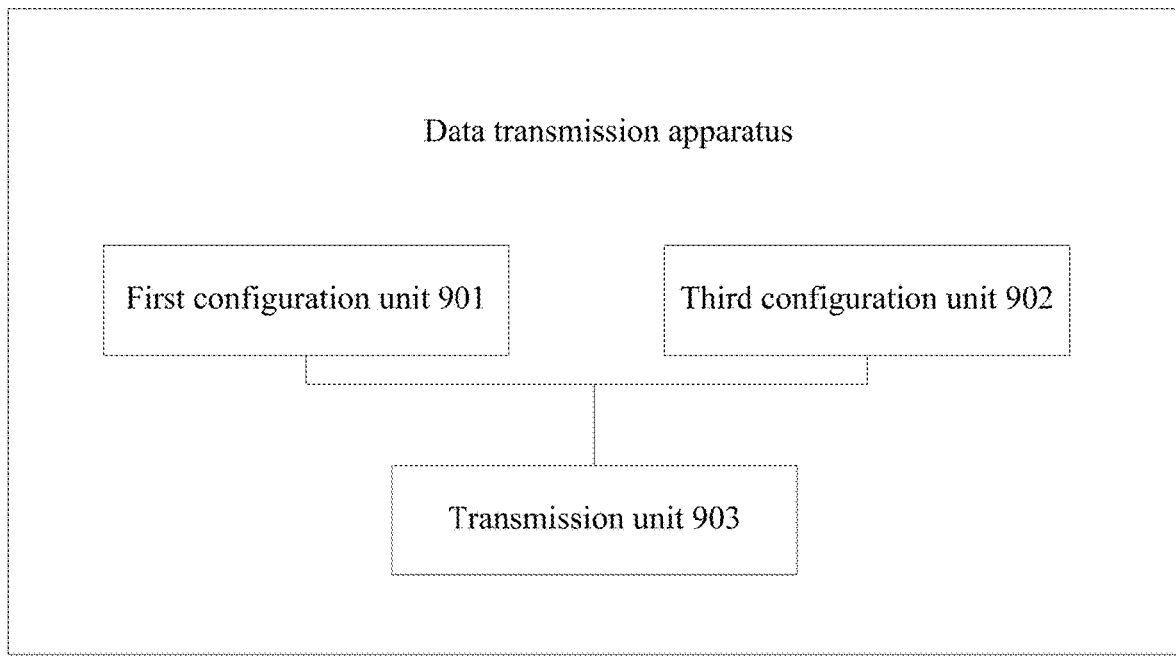
FIG. 9 is a schematic structural diagram 4 of a data transmission apparatus according to an embodiment of the present disclosure.

FIG. 9 is a schematic structural diagram 4 of a data transmission apparatus according to an embodiment of the present disclosure. As shown in FIG. 9, the apparatus includes: a first configuration unit 901, configured to configure and send first configuration signaling, where the first configuration signaling is used to indicate that first data occupies a first resource in a first slot, the first configuration signaling schedules data in N slots including the first slot, and N is an integer greater than 1; a third configuration unit 902, configured to configure and send third configuration signaling, where the third configuration signaling is used to indicate that second data occupies a second resource in the first slot; and a transmission unit 903, configured to: if the second resource and the first resource have a resource overlap in the first slot, determine, based on a preset policy, data transmitted in the first slot.

In an implementation, that the second resource and the first resource have a resource overlap in the first slot includes: in the first slot, at least one time domain symbol in the second resource is located in the first resource.

In an implementation, the first configuration signaling is multi-slot dynamic scheduling signaling, where the multi-slot dynamic scheduling signaling is DCI and/or a MAC CE.

In an implementation, the third configuration signaling is one-slot dynamic scheduling signaling, and the one-slot dynamic scheduling signaling is used to indicate the second resource occupied by the second data in the first slot, where the one-slot dynamic scheduling signaling is DCI and/or a MAC CE.

In an implementation, the transmission unit 903 is configured to the second data in the first slot.

In an implementation, the third configuration signaling is UE-specific RRC signaling.

In an implementation, the transmission unit 903 is configured to the first data in the first slot.

In an implementation, the third configuration signaling is cell-specific RRC signaling.

In an implementation, the transmission unit 903 is configured to the second data in the first slot.

In an implementation, the transmission unit 903 is configured to: if a type of the second data is UL data, receive the second data in the first slot; or if a type of the second data is DL data, send the second data in the first slot.

In an implementation, the transmission unit 903 is configured to: if a type of the first data is UL data, receive the first data in the first slot; or if a type of the first data is DL data, send the first data in the first slot.

A person skilled in the art should understand that for the functions implemented by the units in the data transmission apparatus shown in FIG. 9, refer to the related descriptions of the foregoing data transmission methods for understanding. The functions of the units in the data transmission apparatus shown in FIG. 9 may be implemented by executing a program on a processor or may be implemented by a specific logic circuit.

When the data transmission apparatus in the embodiments of the present disclosure is implemented in the form of software functional modules and sold or used as an independent product, the integrated unit may be stored in a computer-readable storage medium. Based on such an understanding, the technical solutions in the embodiments of the present disclosure essentially, or the part contributing to the prior art may be implemented in a form of a software product. The computer software product is stored in a storage medium and includes several instructions for instructing a computer device (which may be a personal computer, a server, a network device, or the like) to perform all or some steps of the methods described in the embodiments of the present disclosure. The foregoing storage medium includes any medium that can store program code, such as a USB flash drive, a removable hard disk, a read-only memory, a magnetic disk, or an optical disc. In this way, the embodiments of the present disclosure are not limited to any specific combination of hardware and software.

Correspondingly, an embodiment of the present disclosure further provides a computer storage medium, storing computer executable instructions thereon, where the computer executable instructions are executed by a processor to implement the foregoing data transmission methods in the embodiments of the present disclosure.

Figure 10:
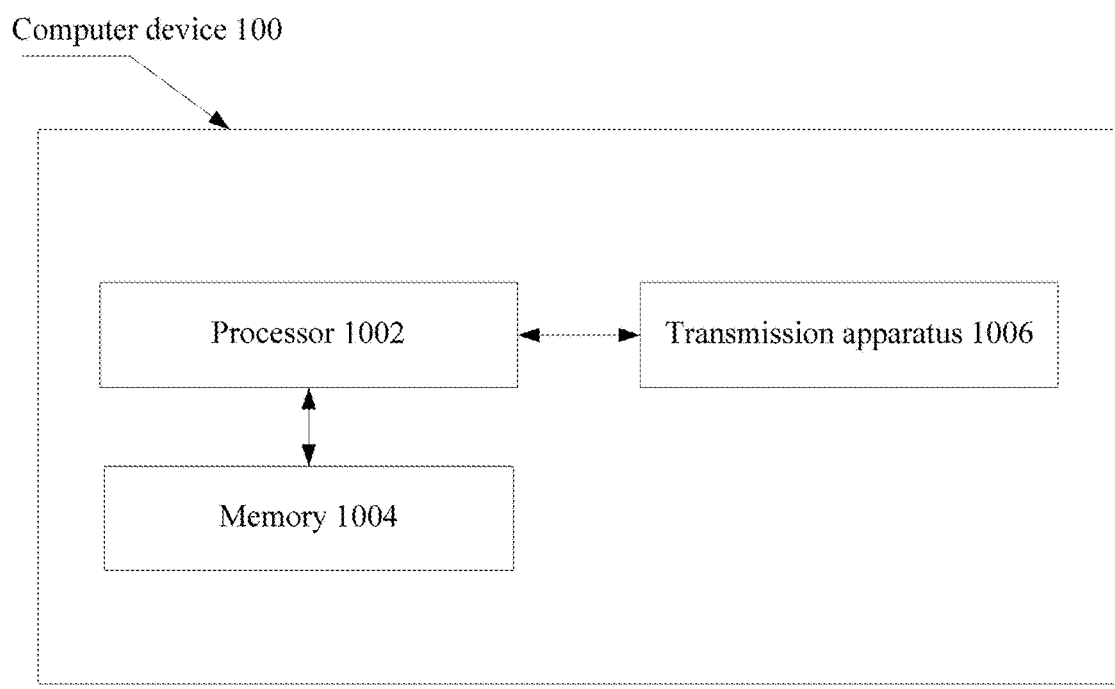
FIG. 10 is a schematic structural diagram of a computer device according to an embodiment of the present disclosure.

FIG. 10 is a schematic structural diagram of a computer device 100 according to an embodiment of the present disclosure. The computer device 100 may be a terminal or a network device. As shown in FIG. 10, the computer device 100 may include one or more (only one is shown) processors 1002 (the processor 1002 may include, but not limited to, a processing apparatus such as a micro controller unit (MCU) or a programmable logic device (a field programmable gate array (FPGA))), a memory 1004 configured to store data, and a transmission apparatus 1006 with a communication function. A person of ordinary skill in the art may understand that the structure shown in FIG. 10 is merely an example, but does not constitute a limitation to the structure of the foregoing computer device. For example, the computer device 100 may also include more or fewer components than those shown in FIG. 10 or have a configuration different from that shown in FIG. 10.

The memory 1004 may be configured to store software programs and modules of application software, for example, program instructions/modules corresponding to the methods in the embodiments of the present disclosure. The processor 1002 executes the software programs and modules stored in the memory 1004, to perform various functional applications and data processing, that is, to implement the foregoing methods. The memory 1004 may include a high speed random access memory, and may also include a nonvolatile memory such as one or more magnetic storage devices, flash memories or other nonvolatile solid-state memories. In some examples, the memory 1004 may further include memories remotely disposed relative to the processor 1002. These remote memories may be connected to the computer device 100 through a network. Examples of the network include, but are not limited to, the internet, an intranet, a local area network, a mobile communications network, or a combination thereof.

The transmission apparatus 1006 is configured to receive or send data through one network. Specific example of the foregoing network may include wireless network provided by a communication provider of the computer device 100. In an example, the transmission apparatus 1006 includes a network interface controller (NIC) and may be connected to other network devices through a base station to communicate with the internet. In an example, the transmission apparatus 1006 may be a radio frequency (RF) module and is configured to communicate with the internet wirelessly.

The technical solutions recorded in the embodiments of the present disclosure can be randomly combined without causing any conflict.

In the several embodiments provided in the present disclosure, it should be understood that the methods and intelligent devices may be implemented in other manners. The described device embodiments are merely schematic. For example, the unit division is merely logical function division and may be other division in actual implementation. For example, a plurality of units or components may be combined or integrated into another system, or some features may be ignored or not performed. In addition, the mutual couplings or direct couplings or communication connections between the displayed or discussed parts may be implemented through some interfaces. The indirect couplings or communication connections between the devices or units may be implemented in electrical, mechanical or other forms.

Units described as separate components may be or may not be physically separated. Components shown as units may be or may not be physical units, that is, may be integrated or distributed to a plurality of network units. Some or all of the modules may be selected to achieve the objective of the solutions of the embodiments according to actual requirements.

In addition, the functional units in the embodiments of the present disclosure may be integrated into a processing unit, or each of the units may exist alone, or two or more modules may be integrated into one unit. The integrated unit may be implemented in the form of hardware, or may be implemented in the form of a hardware function unit and a software functional unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A method for transmitting data in a wireless communication network, comprising:
    sending, by a network device, first configuration signaling to a terminal, wherein the first configuration signaling is used to determine a first resource occupied by first data in a first slot;
    sending, by the network device, third configuration signaling to the terminal, wherein the third configuration signaling is used to determine a second resource occupied by second data in the first slot and the third configuration signaling has a different type of configuration signaling from the first configuration signaling; and
    when at least one time domain symbol in the second resource is located in the first resource in the first slot, determining, by the network device based on a preset policy, data transmitted in the first slot,
    wherein the first configuration signaling is downlink control information (DCI) and is used for scheduling of data in N slots, wherein the N slots comprise the first slot, and N is an integer greater than 1,
    wherein when the third configuration signaling is user equipment (UE)-specific Radio Resource Control (RRC) signaling, the network device performs transmission of the first data in the first slot as scheduled by the first configuration signaling, and
    wherein when the third configuration signaling is cell-specific Radio Resource Control (RRC) signaling, the network device performs transmissions of the second data in the first slot as scheduled by the third configuration signaling.

2. The method according to claim 1, wherein when the first data is in the first slot, the first slot is not used to transmit the second data.

3. The method according to claim 2, wherein performing, by the network device, transmission of the first data in the first slot comprises:
    when a type of the first data is uplink (UL) data, receiving, by the network device, the first data in the first slot; or
    when the type of the first data is downlink (DL) data, sending, by the network device, the first data in the first slot.

4. The method according to claim 1, wherein when the second data is in the first slot, the first slot is not used to transmit the first data.

5. The method according to claim 4, wherein performing, by the network device, transmission of the second data in the first slot comprises:
    when a type of the second data is uplink (UL) data, receiving, by the network device, the second data in the first slot; or
    when the type of the second data is downlink (DL) data, sending, by the network device, the second data in the first slot.

6. A network device, comprising a processor, a transceiver, a memory and instructions stored in the memory that, when executed by the processor, cause the network device to perform a plurality of operations comprising:
    sending first configuration signaling to a terminal, wherein the first configuration signaling is used to determine a first resource occupied by first data in a first slot;
    sending third configuration signaling to the terminal, wherein the third configuration signaling is used to determine a second resource occupied by second data in the first slot and the third configuration signaling has a different type of configuration signaling from the first configuration signaling; and
    when at least one time domain symbol in the second resource is located in the first resource in the first slot, determining, based on a preset policy, data transmitted in the first slot via the transceiver,
    wherein the first configuration signaling is downlink control information (DCI) and is used for scheduling of data in N slots, wherein the N slots comprise the first slot, and N is an integer greater than 1,
    wherein when the third configuration signaling is user equipment (UE)-specific Radio Resource Control (RRC) signaling, the network device performs transmission of the first data in the first slot as scheduled by the first configuration signaling, and
    wherein when the third configuration signaling is cell-specific Radio Resource Control (RRC) signaling, the network device performs transmission of the second data in the first slot as scheduled by the third configuration signaling.

7. The network device according to claim 6, wherein when the first data is in the first slot, the first slot is not used to output the second data.

8. The network device according to claim 7, wherein the plurality of operations further comprise:
    when a type of the first data is uplink (UL) data, receiving the first data in the first slot; or
    when the type of the first data is downlink (DL) data, sending the first data in the first slot.

9. The network device according to claim 6, wherein when the second data is in the first slot, the first slot is not used to output the first data.

10. The network device according to claim 9, wherein the plurality of operations further comprise:
    when a type of the second data is uplink (UL) data, receiving the second data in the first slot; or
    when the type of the second data is downlink (DL) data, sending the second data in the first slot.

11. A non-transitory computer storage medium, storing computer-executable instructions thereon, wherein the computer-executable instructions are executed by a processor of a network device having a transceiver to implement a plurality of operations comprising:

sending first configuration signaling to a terminal, wherein the first configuration signaling is used to determine a first resource occupied by first data in a first slot;

sending third configuration signaling to the terminal, wherein the third configuration signaling is used to determine a second resource occupied by second data in the first slot and the third configuration signaling has a different type of configuration signaling from the first configuration signaling; and when at least one time domain symbol in the second resource is located in the first resource in the first slot, determining, based on a preset policy, data transmitted in the first slot via the transceiver, wherein the first configuration signaling is downlink control information (DCI) and is used for scheduling of data in N slots, wherein the N slots comprise the first slot, and N is an integer greater than 1, wherein when the third configuration signaling is user equipment (UE)-specific Radio Resource Control (RRC) signaling, the network device performs transmission of the first data in the first slot as scheduled by the first configuration signaling, and wherein when the third configuration signaling is cell-specific Radio Resource Control (RRC) signaling, the network device performs transmission of the second data in the first slot as scheduled by the third configuration signaling.

12. The non-transitory computer storage medium according to claim 11, wherein when the first data is transmitted in the first slot via the transceiver, the first slot is not used to transmit the second data.

13. The non-transitory computer storage medium according to claim 11, wherein when the second data is in the first slot via the transceiver, the first slot is not used to transmit the first data.

* * * * *